May 20, 1930.　　　　E. A. WRIGHT　　　　1,759,250
VEHICLE TOP
Filed Aug. 2, 1926
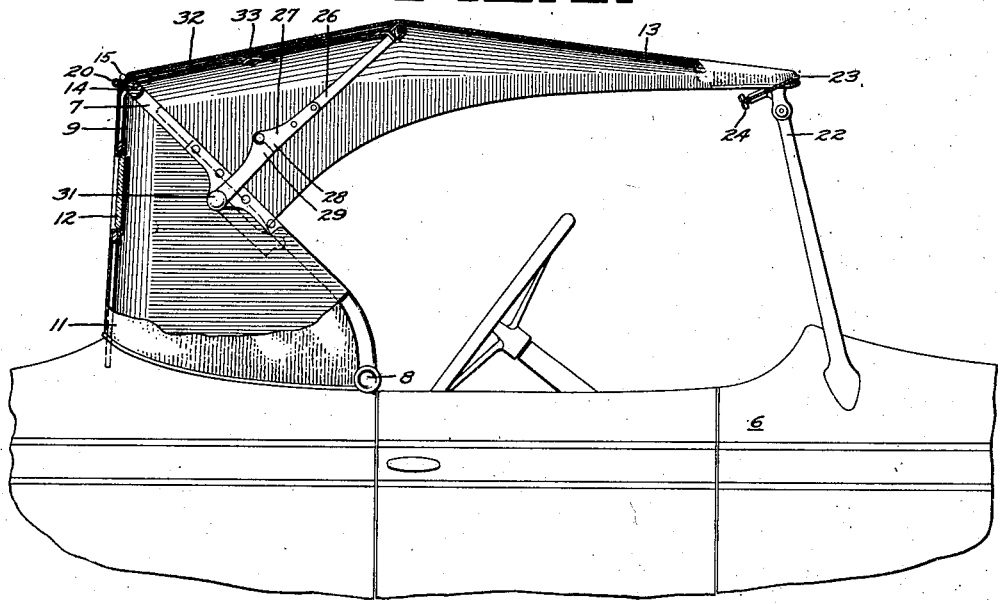
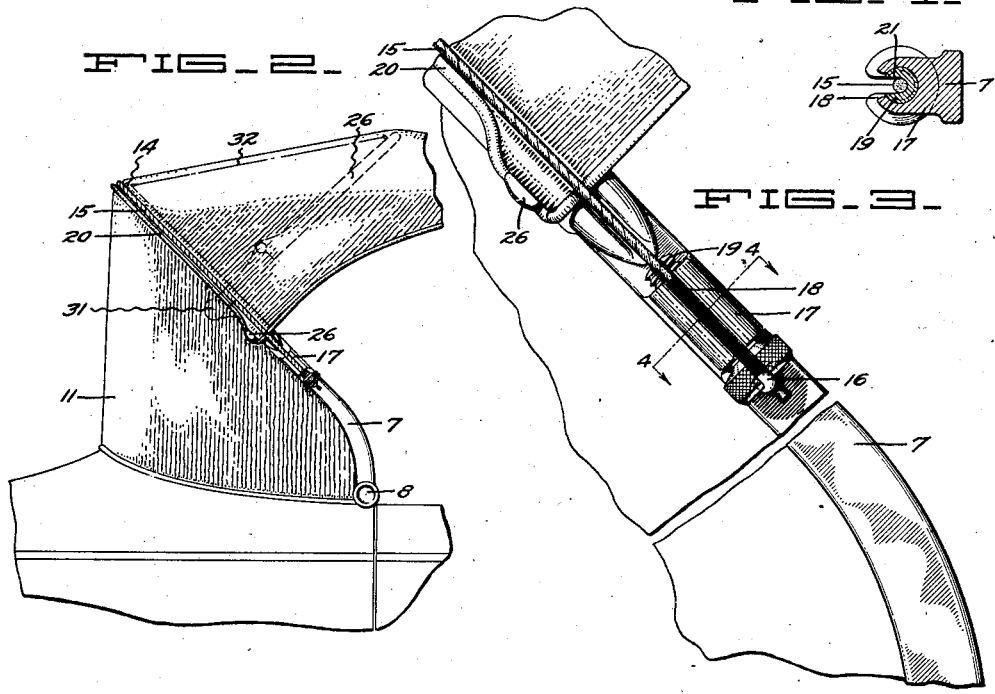
INVENTOR
EDWARD A. WRIGHT
BY
his ATTORNEYS Patented May 20, 1930

1,759,250

UNITED STATES PATENT OFFICE

EDWARD A. WRIGHT, OF FRESNO, CALIFORNIA

VEHICLE TOP

Application filed August 2, 1926. Serial No. 126,577.

My invention relates to tops for vehicles, particularly automobiles, and relates especially to tops made of fabric or other flexible material which are adapted to be raised or lowered to suit the convenience of the occupants of the vehicle.

In automobiles of the open type, such as roadsters or phaetons, and even in landaulets it is often desirable to lower the top of the vehicle to increase the field of vision of the occupants of the vehicle or to permit the enjoyment of a salubriods climate but, in most cases, when the top of the vehicle is lowered almost no protection is offered from the currents of air which are deflected by the wind shield and sweep up over the top of the vehicle. The deflected air flows around in eddy currents and whorls which curl in at the rear of the car and form drafts which blow upon the occupants from the rear.

It is therefore an object of my invention to provide a vehicle top which has a stationary rear portion to deflect eddy currents and drafts tending to blow upon occupants of the vehicle from the rear.

Another object of my invention is to provide a readily attachable and detachable cover portion for a vehicle top.

Another object of my invention is to provide a detachable cover portion for a vehicle top which when detached may be folded into a compact package and stowed in a convenient place about the car.

Another object of my invention is to provide a vehicle top which has substantially the appearance of the conventional type of vehicle top but which is possessed of various advantages thereover.

The invention possesses other advantageous features, some of which with the foregoing, will be set forth at length in the following description where I shall outline in full that form of the vehicle top of my invention, which I have selected for illustration in the drawings accompanying and forming part of the present specification. In said drawings I have shown one form of vehicle top embodying my invention, but it is to be understood that I do not limit myself to such form since the invention, as set forth in the claims, may be embodied in a plurality of forms.

In the drawings:—

Figure 1 is a side elevation of a portion of a vehicle employing the top of my invention, a portion of the near side of the top being broken away to disclose the interior construction.

Figure 2 is a view similar to Figure 1 and showing in side elevation the exterior of the rear portion of the top of my invention.

Figure 3 is an enlarged fragmentary view of the tensioning and fastening device for the cord which secures the cover portion to the rear bow.

Figure 4 is a cross section on the line 4—4 of Figure 3.

Broadly speaking, my invention comprises a vehicle top which is provided with an upstanding rear portion, which is preferably left permanently in upstanding position, and a detachable, flexible cover portion stretched between the rear upstanding portion and a front support which usually is the vehicle windshield.

Particular reference is made to Figs. 1 and 2 of the drawings. The vehicle body 6 is provided with a top bow 7 of the usual composite metal and wood construction preferably pivoted to the vehicle body by means of a pin 8. The bow 7 is maintained in upstanding position on the body 6 by means of metal rods 9 which at their lower ends fit detachably in suitable sockets in the body 6 and at their upper ends engage the wood portion of the bow 7. The quarters and the rear of the top are shielded by a strip or sheet of fabric, leather or similar flexible material 11 which is stretched between the body 6 and the bow 7 and is fastened in place by upholstery tacks or snap fasteners in the usual manner. The rear curtain 11 is provided, if desired, with a rear vision window 12 of the standard kind.

It is contemplated that the rear portion of the top, just described, will in most instances remain permanently in place and if such is the case, the pivot 8 may be omitted and the bow 7 may be rigidly attached to the body 6 at that point. The supports 9 may then be permanently fixed in place in the body and in the wooden portion of the bow 7. The upstanding rear portion of the top is preferably left permanently in place and is effective in preventing the eddy currents and drafts formed by the currents of air which are deflected by the windshield and sweep upward over the top of the vehicle from striking the occupants from the rear. The upstanding portion, however, interferes in nowise with the range of vision enjoyed by the vehicle occupants.

Means are provided for stretching a sheet of flexible material such as fabric or leather over the top of the vehicle to form a cover portion 13 affording more protection from the elements than is offered by the rear section alone. For that purpose the wooden portion of the bow 7 is provided in its outer side with a longitudinal groove 14 which extends across the back of the bow and well down the sides. It is intended to place the top fabric 13 across the groove 14 and then tension a cord 15 against the fabric thereby drawing the fabric into the groove and maintaining it in position. In order to insure that the cord 15 is taut thruout its length, no part of the grooved portion of the top bow is made straight but it is curved slightly in a convex direction thruout its entire length. The ends of the cord 15, which is preferably a light metal cable, are provided with suitable balls 16 securely attached thereto and utilized in placing the cord 15 in tension. Each side of the top bow 7 is made with a projection 17 which extends outwardly from the metal portion and which is provided with a central longitudinal groove 18 in alinement with the groove 14 in the wooden portion of the bow. The projection 17 is pierced by a longitudinal bore parallel with and opening into the groove 18. A suitable screw 19 engages the threaded bore and is cut along one side by a slot 21. To tension the cord 15, the parts are placed in the position shown in Fig. 3, with the cord inserted thru the slot 18 into the center part of the screw 19 and with the ball 16 engaging the head of the screw. When the screw is rotated the cord is placed in tension and is drawn into the groove 14 thereby securely holding the cover portion 13 in place. The edges of the cover material 13 may be enlarged by beads 20 so that the material cannot slip under the cord 15.

An exactly similar arrangement is provided at the forward end of the top and is attached to the windshield 22. The front cord 23 is tensioned by means of suitable screws 24 whereby the front of the cover portion may be securely fastened to the windshield. To aid in positioning the cover portion 13 before the cords 15 and 23 are in place, suitable snap fasteners 26 are provided at appropriate points on the bows. The fasteners are primarily to hold the top material in place until the cords come into play.

Means are provided for tautening the top portion in order to lend a good appearance and to give it approximately the conventional contour. A forward bow 26 of the usual composite wood and metal construction is provided intermediate its ends with two toggle joints 27 each of which is formed with suitable abutting shoulders 28 and 29 serving as stops. The lower half of each toggle is pivoted at 31 to a depending metal portion of the bow 7. The forward bow 26 is so located and pivoted that when folded it lies below and inside of the top line of the bow 7, so that it is not visible from outside of the vehicle and does not detract from the appearance of the top. The bow 26 is held in proper position against the top material by means of a strap or straps 32 each of which is at its rear end affixed to the bow 7 and at its forward end is affixed to a suitable clamp on the bow 26. Buckles 33 are provided intermediate the ends of the straps in order to adjust them for length and thereby to position the bow 26 in a proper manner. It is intended that the straps 33 be once adjusted to give the proper contour to the top and that further movement of the bow 26 be taken care of by means of the toggles 27.

In setting up the top of my invention for use, the top portion 13 which is usually stowed at a convenient point about the car is unfolded and is snapped in position on the windshield 22 and on the rear bow 7 by means of the snaps 26. The forward bow 26 is in the position indicated by the dotted lines in Fig. 1 and is not at this time extended to tension the cover portion 13. When the cover portion is in place, the front cord 23 is placed over the material and the ends of the cord are slipped into the screws 24 which are turned suitably to receive them. The screws 24 are then rotated to tension the cord 23 and draw the top material into the forward groove thereby retaining it firmly in place. The rear cord 15 is then suitably positioned over the rear groove 14 and the screws 19 are properly turned, after the ball ends 16 have been placed therein, to tension the cord and draw the top material firmly into place in the groove 14 thereby maintaining it in position. The cover portion is then firmly affixed in position and no load is borne by the snaps 26. At this juncture, the front bow 26 may be pulled forward from its collapsed position and be forced upwardly to tauten or tension the top material by closing the toggle 27. The toggle is moved slightly past center position until the shoulders 28 and 29 abut each other. The cover portion is then not only held firmly in position but it is sufficiently taut to give it a smooth contour in accordance with the prevailing ideas of top construction.

The top is dismantled by proceeding in substantially the reverse order. That is, the toggle 27 is broken and folded into the position shown in the dotted lines in Fig. 1, the screws 19 and 24 are turned to release the tension of the cords 15 and 23, the snaps 26 are unfastened and the cover portion 13 is removed from the bows and folded to be stored at a convenient point in the vehicle body. The protection of the rear quarter is thereby obtained but the vision of the vehicle occupants is obstructed in no manner. As has been before stated the rear quarter may be fastened to the body so that it may be removed if desired.

It will be observed that the top of my invention presents the usually sightly conventional appearance, may be readily dismantled and stowed away, possesses the additional advantage of preventing back drafts upon the vehicle occupants and furthermore may be readily and easily set up.

I claim:—

1. A top for a vehicle having an open body, comprising a draft shield adapted to remain upright at the rearward part of said body, an upright windshield at the forward part of said body, a flexible cover portion fastened to said windshield and said draft shield, and a toggle-jointed bow mounted on said draft shield for tautening said cover portion.

2. A top for a vehicle having an open body, comprising a draft shield adapted to remain in upright position, said draft shield including an upright wall extending across the back and along the sides of a seat of said vehicle, a wind shield mounted on said vehicle forward of said seat, a flexible cover portion detachably mounted on said draft shield and said wind shield, a toggle-jointed bow hinged to said draft shield for tautening said cover portion, and an adjustable means for positioning said bow.

3. A top for a vehicle having an open body, comprising a draft shield adapted to remain in upright position, said draft shield including a bow curved convexly for substantially its entire length and having a groove in the convex periphery thereof, supports for spacing said bow from said body, a sheet of material fastened to said body and said bow and forming an upright wall across the back and along the sides of a seat of said vehicle, a wind shield mounted on said vehicle forward of said seat, said wind shield being provided with a convexly curved portion having a groove therein, a flexible cover portion overlying both of said grooves, cords for forcing said cover portion into said grooves, means for tightening said cords, a toggle-jointed bow pivoted to said draft shield and adapted when extended to tauten said cover portion, and an adjustable strap for positioning said toggle-jointed bow.

4. In a vehicle top, a bow having a groove therein, a cover portion adapted to overlie said bow and said groove, a cord for retaining said cover portion in said groove, and a fastener for removably retaining said cover portion on said bow when said cord is inoperative.

In testimony whereof, I have hereunto set my hand.

EDWARD A. WRIGHT.